United States Patent [19]
Ebenfelt

[11] Patent Number: 5,258,054
[45] Date of Patent: Nov. 2, 1993

[54] METHOD FOR CONTINUOUSLY PRODUCING STEEL OR SEMI-STEEL

[76] Inventor: Li W. Ebenfelt, 45 E. 89th St., Apt. 32C, New York, N.Y. 10128

[21] Appl. No.: 788,785

[22] Filed: Nov. 6, 1991

[51] Int. Cl.$^5$ ............................................. C21B 13/14
[52] U.S. Cl. ......................................... 75/443; 75/501; 75/958
[58] Field of Search ................. 75/443, 501, 502, 957, 75/958

[56] References Cited

U.S. PATENT DOCUMENTS

| | | |
|---|---|---|
| 841,212 | 1/1907 | Adams et al. |
| 1,567,934 | 12/1925 | Ferguson |
| 1,775,713 | 9/1930 | Baily |
| 1,799,643 | 4/1931 | Rogers |
| 3,136,622 | 6/1964 | Pratt |
| 3,150,958 | 9/1964 | Collin et al. |
| 3,163,520 | 12/1964 | Collin et al. |
| 3,463,472 | 8/1969 | Worner |
| 3,617,042 | 11/1971 | Nagkagawa |
| 3,734,716 | 5/1973 | Seglin et al. |
| 4,200,265 | 4/1980 | Berndt et al. |
| 4,434,003 | 2/1984 | Geskin |
| 4,849,015 | 7/1989 | Fassbinder |
| 4,861,369 | 8/1989 | von Bogdandy et al. ......... 75/958 |
| 4,976,776 | 12/1990 | Elvander et al. ................. 75/502 |
| 5,013,355 | 5/1991 | Elvander et al. ................. 266/157 |

FOREIGN PATENT DOCUMENTS

| | | | |
|---|---|---|---|
| 747868 | 12/1932 | France | |
| 1046675 | 10/1966 | United Kingdom | ............... 75/501 |

OTHER PUBLICATIONS

HIsmelt Direct Smelting Process brochure Sep. 91.
Ironmaking and Steelmaking 1987 vol. 14 No. 2 pp. 49–75 "Coal-based ironmaking" by Smith and Corbett.
"Direct Steelmaking Program Proposed for the United States" TP McAloon pp. 30–32 *I&SM* Jul. 88.

*Primary Examiner*—Melvyn J. Andrews
*Attorney, Agent, or Firm*—James & Franklin

[57] ABSTRACT

A fine particle mixture of iron concentrate and pulverized flux is introduced into the upper portion of the vertical prereduction section of a sealed unitary vessel. Heated gas partially reduces the iron concentrate particles to form wustite which falls to the lower portion where it is melted to form fluid slag. The slag passes into the horizontal section of the vessel which is divided by a barrier into a reduction portion and an oxidation portion. In the reduction portion, pulverized coal and oxygen are introduced and the FeO in the slag is reduced to iron. The entrained iron droplets in the slag are permitted to sediment in a quiescent zone where the slag is removed. The molten iron flows through passages in the lower portion of the barrier into the oxidation portion where oxygen is introduced to remove C, Si, P and other impurities. The final product and waste are separately removed from the oxidation portion. Exhaust gases exit a vertical stack where heat is recaptured and dust particles removed. A portion of the exhaust gas is reheated and fedback into the prereduction section.

60 Claims, 4 Drawing Sheets

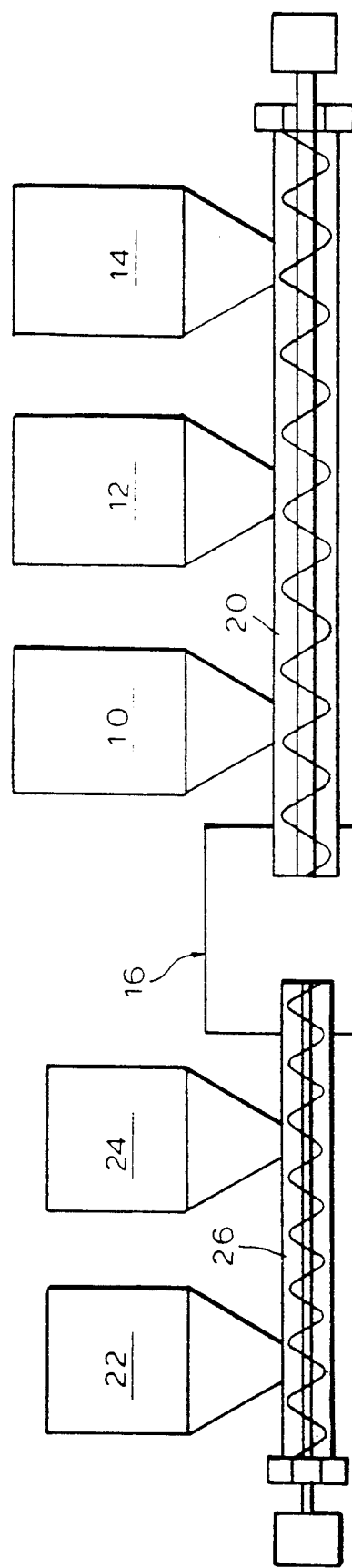
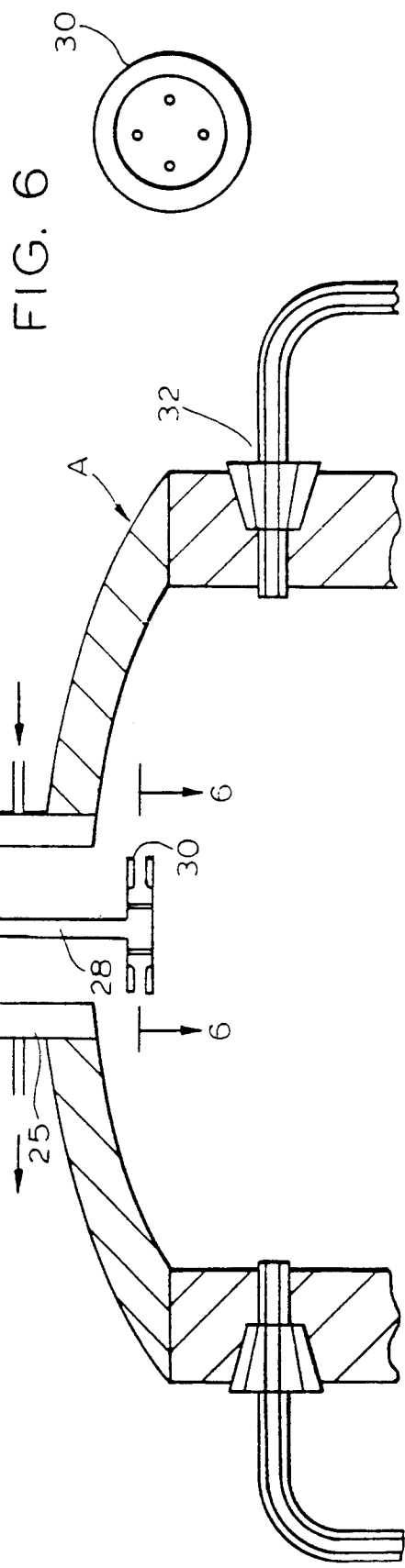

METHOD FOR CONTINUOUSLY PRODUCING STEEL OR SEMI-STEEL

The present invention relates to steel production and more particularly to a method of continuously producing steel or semi-steel from iron ore and pulverized coal in a sealed unitary vessel, which is economical to build and operate, energy efficient, and produces minimal pollutants.

Current iron and steel making processes in integrated steel plants use a blast furnace to produce molten iron and a separate basic oxygen furnace to convert the molten iron into steel. The modern blast furnace is a huge facility whose construction requires very high capital investment. For example, a furnace capable of producing 5,000 tons of iron a day would require an investment of more than $200 million. The blast furnace uses coke as fuel, reductant, and most importantly to support the moving bed to allow the passage of exhaust gas without causing excessive pressure drop.

The coke oven represents another large investment and also involves substantial environmental problems. A battery of coke ovens, capable of producing 3,000 tons of coke a day, require an investment of about $200 million.

The extent of iron ore preparation required by the blast furnace also contributes to the high cost of the process. A sinter plant capable of producing 5,000 tons of iron a day would require an investment of about $100 million.

The huge investment costs of the conventional blast furnace, the coke ovens and the sinter plant, as well as the environmental problems associated with the coke ovens and the sinter plants have prevented the building of new blast furnaces.

It is, therefore, a prime object of the present invention to provide a method and apparatus for continuously producing steel or semi-steel which requires greatly reduced capital investment, has relatively low operating costs, is energy efficient and is environmentally safe.

In general, this is achieved in my invention through the use of a single, sealed vessel for continuously producing steel or, semi-steel which uses pulverized coal instead of coke as fuel and reductant. Fine iron concentrate is employed so that sintering and pelletizing are not required. Both thermal and chemical energies in the high temperature exhaust gas are recovered to enhance energy conservation and reduce cost. Moreover, the use of electricity is restricted to further maximize energy efficiency.

More specifically, in my invention, fine iron concentrate and flux are continuously introduced into a vertical prereduction shaft of the vessel where they are heated, partially reduced and then melted. The molten FeO slag is reduced in a horizontal smelting-reduction chamber where pulverized coal and industrial pure oxygen or oxygen enriched air are injected. Finally, the molten iron containing high carbon, silicon and other impurities is converted into steel or semi-steel using industrial pure oxygen. This takes place in an oxidation chamber which is separated from the reduction chamber by a partition wall or barrier which has fluid flow passages in the lower portion. The end product produced may be further refined or alloyed in a ladle, as required. A portion of the exhaust gas, after passing through a waste heat boiler to generate electricity and a gas cleaning system to release heat and fine dust particles, may be reused in the prereduction chamber.

In accordance with one aspect of the present invention, a sealed unitary vessel is provided for continuously producing steel or semi-steel from iron ore concentrate and pulverized coal. The vessel includes a vertically extending prereduction section which has an upper and a lower portion. Means are provided for introducing a fine particle mixture of iron ore concentrate and pulverized flux into the upper portion. Means are provided for introducing heated gas to heat and partially reduce the iron particles to form wustite. Means are provided for melting wustite in the lower portion to form fluid slag. The vessel also includes a horizontally extending reduction - oxidation section which has a barrier dividing it into a reduction portion and an oxidation portion. The reduction portion includes a reducing zone which receives the slag and a quiescent zone. Means are provided for introducing pulverized coal and oxygen enriched air into the reducing zone. In the quiescent zone, the reduced slag is permitted to sediment and waste is removed. The barrier extends from the floor of the reduction-oxidation section to a point above the surface of the fluid and has flow passages connecting the quiescent zone and the oxidation portion. Means are provided for introducing oxygen in the oxidation portion. Means are provided for removing the end product from the oxidation portion. Means are also provided for removing exhaust gases from the vessel. The exhaust gas removing means extends from the reduction-oxidation section and includes an exhaust gas outlet.

The upper portion of the prereduction section includes an inlet. The means for introducing the fine particle mixture includes a hopper having an outlet and means for sealingly connecting the hopper outlet and the inlet. A first feed bin is adapted to contain fine particles of dry iron concentrate. A second feed bin is adapted to contain fine particles of pulverized flux. Screw conveyor means are employed for conveying particles from the bins to the hopper. Valve means are provided for sealing each of the feed bins.

A supply of distribution gas is provided. A conduit connects the distribution gas supply to the hopper outlet connecting means. Means are provided for cooling the connecting means. Radially directed particle distribution means are provided at the end of the connecting means.

Tuyere assembly means are provided for introducing the heated gas into the upper portion of the prereduction section. Burner means are provided in the lower section to produce a high FeO fluid slag.

Lance means are provided for introducing industrial pure oxygen or oxygen enriched air into the reducing zone. The lance means are located above the fluid surface.

The waste outlet means in the quiescent zone are located at a level above the barrier passages. Means are provided for introducing an inert agitation gas into the quiescent zone. Tuyere means located below the surface of the fluid are utilized for this purpose.

Lance means are utilized to introduce oxygen above the surface of the fluid in the oxidation portion. Tuyere means located below the fluid surface are provided for introducing agitation gas within the oxidation portion.

The reduction-oxidation section includes a floor which is preferably inclined with respect to the horizontal. The floor is inclined toward the end product means.

Waste heat recapture means are preferably located in the exhaust gas removal means. Means for cleaning the exhaust gas are preferably connected to the exhaust gas outlet.

Means are provided for heating a portion of the exhaust gas for feedback to the prereduction section. The heating means has a fuel inlet connected to the exhaust gas outlet such that some of the exhaust gas may be used as fuel.

The prereduction section preferably comprises a substantially cylindrical shaft. The reduction-oxidation portion preferably has either a circular or rectangular cross-sectional configuration.

The exhaust gas removal means preferably extends vertically above the reduction-oxidation section. Waste outlet means are preferably located in the oxidation section as well as in the quiescent zone. The waste outlet means in the oxidation section is located above the end product outlet means.

In accordance with another aspect of the present invention, a method for continuously producing steel or semi-steel from iron ore concentrate and pulverized coal in a sealed unitary vessel is provided. A mixture of fine particles of iron concentrate and pulverized flux is introduced into the upper portion of a vertically extending prereduction section of the vessel. Heated gas is introduced to heat and partially reduce the iron concentrate particles to form wustite. The wustite is melted in the lower portion of the prereduction section to form fluid slag with the flux. Pulverized coal and oxygen are introduced into a reduction portion of the vessel to reduce the fluid slag. The slag is permitted to settle in a quiescent zone to sediment the entrained iron droplets and then is removed. The molten iron then flows through passages in the lower portion of a barrier into the oxidation portion of the vessel where oxygen is introduced to remove C, Si and P from the molten iron. The end product is then removed. Exhaust gas is also removed from the vessel.

The step of introducing the fine particle mixture includes charging a hopper with fine particles of dry iron ore concentrate and pulverized flux from feed bins by screw conveyors. The hopper has an outlet sealingly connected to the inlet in the upper portion of the prereduction section. Distribution gas is introduced into the inlet. The inlet is also cooled. The particles are radially directed by the distribution gas as they enter the upper portion.

Industrial pure oxygen or oxygen enriched air is introduced into the reduction portion at a level above the surface of the fluid. Slag is removed from the quiescent zone from a level above the barrier passages. Agitation gas is introduced into the quiescent zone to assist sedimentation of the entrained iron droplets.

Oxygen is introduced into the oxidation section at a level above the surface of the fluid. Agitation gas may be introduced into the oxidation portion.

The floor of the vessel is preferably inclined. Waste heat preferably is recaptured from the exhaust gas. A cyclone is preferablly connected to receive the exhaust gas. Dust particles are preferably electrostatically precipitated out of the exhaust gas. A portion of the exhaust gas may be heated and recycled to the prereduction section. A portion of the exhaust gas preferably is used to fuel the exhaust gas heater.

Waste slag also is removed from the oxidation portion. The slag is removed from the oxidation portion at a level above the level at which the end product is removed.

As to these and such other objects which may hereafter appear, the present invention relates to a method and apparatus for continuously producing steel or semi-steel as set forth in the following specification and recited in the annexed claims, taken together with the accompanying drawings wherein like numerals refer to like parts and in which:

FIG. 4 is a front elevational view of the feed mechanism associated with the vessel of the present invention;

FIG. 6 is a sectional view taken along line 6—6 of FIG. 4.

Figure 1:
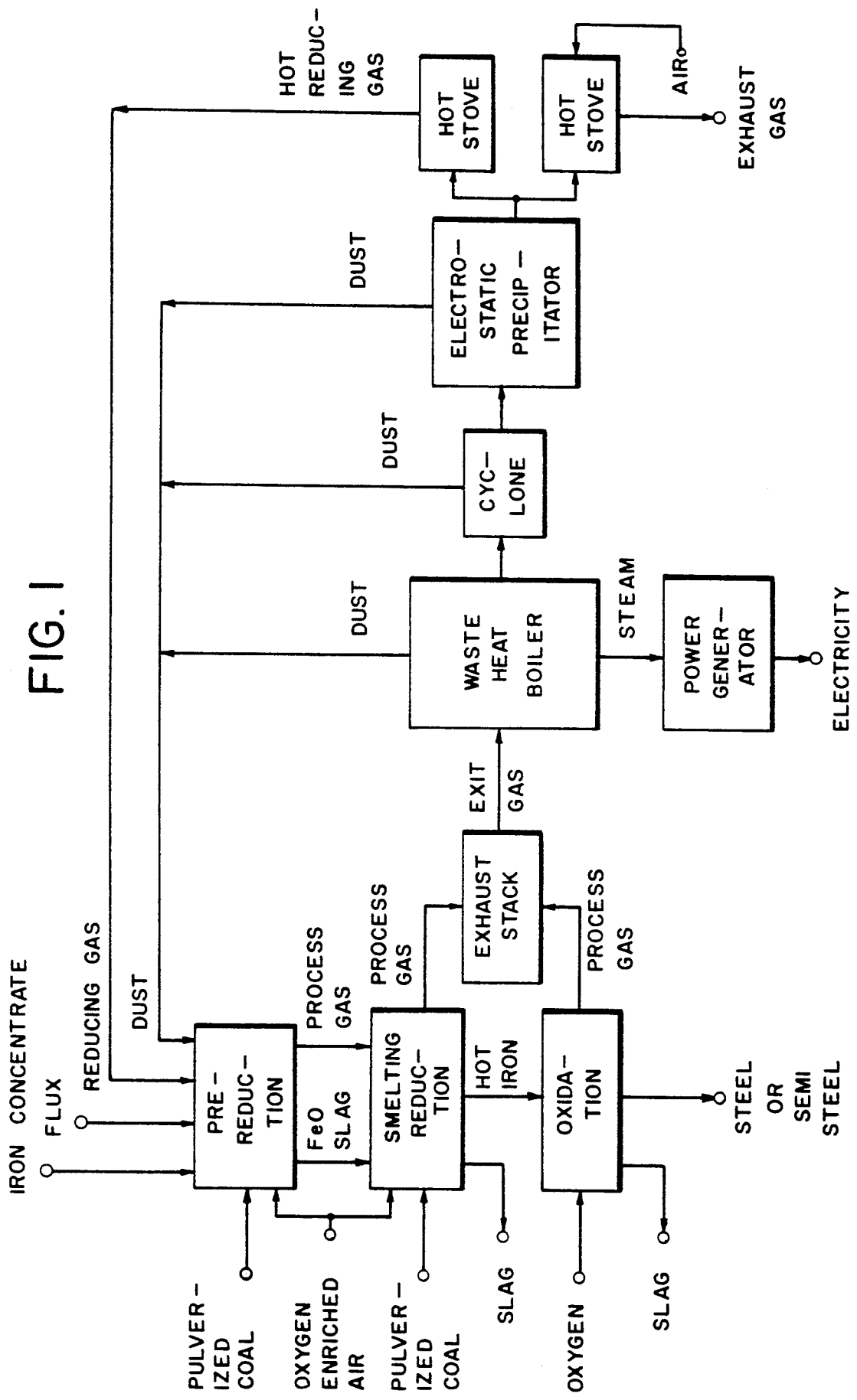
FIG. 1 is a flow chart of the method of the present invention.

As schematically depicted in FIG. 1, iron ore concentrate and pulverized flux are charged by two separate screw conveyors into a hopper, from which the mixture of fine particles descends to the prereduction shaft where it is heated and partially reduced (to form wustite) by a high temperature (about 1200° C.) reducing gas blown in through tuyeres which are located near the top of the shaft. Pulverized coal burners, located near the bottom of the shaft, provide heat required for melting the FeO and flux particles. The inlet ratio of $CO/CO_2$ is maintained at about 0.5, which is thermodynamically sufficient to reduce iron ore to FeO.

In comparison with the emerging coal based iron making processes proposed by others, the use of a unitary vessel with a shaft in which iron ore concentrate is reduced to wustite which is then melted and falls into an interconnected reduction-smelting chamber, as in my invention, offers several advantages. All problems associated with the transfer of prereduced iron ore pellets or fines are eliminated, as compared to processes which require a separate shaft furnace or fluid bed for prereduction. Also, the amounts of fine dust particles carried over to the exhaust is minimized, as compared to other processes in which the fine particles charged to the furnace flow counter-currently with the exit gas. Finally, heat losses during the transfer of the prereduced products are eliminated.

The molten FeO slag enters a rectangular or cylindrical cross-sectional shaped horizontal chamber where it is reduced by pulverized coal injected from the top of the chamber. The process heat required by the endothermic reaction for iron reduction is provided by partial combustion of coal and by post combustion of CO gas produced from iron reduction, with industrial pure oxygen or oxygen enriched air introduced through top lances. The slag produced during this stage is tapped out of the furnace after settling down in a quiescent zone of the chamber to sediment the entrained metallic iron. The molten iron produced is introduced through a submerged passage in a barrier or dam into the oxidation chamber. The bath temperature in the reduction stage of the process is controlled by the degree of post combustion, the amount of heat loss through the vessel walls, as well as the heat transfer efficiency between the high temperature gas and slag layer.

In most of the emerging smelting-reduction processes for ironmaking, separate vertical or horizontal furnaces are used. In those furnaces, violent agitation of the bath created by air or oxygen injection makes the concentration of iron in the slag much higher than its equilibrium concentration. This is due to the entrainment of iron droplets in the slag. In my invention, the provision of a quiescent zone in the smelting-reduction chamber allows settling to occur which results in better slag-metal separation. Thus, the slag tapped from the smelting-reduction chamber of the present invention would have much lower iron concentration.

In the smelting-reduction stage, FeO in the slag is reduced by carbon dissolved in the iron Carbon is provided continuously by pulverized coal which is fed through top lances. Since carbon dissolves rapidly in the molten iron, the overall rate of iron reduction depends on the rate of mass transfer of carbon and FeO to the reaction interface. Therefore, bath agitation plays a prominent role in achieving a high reaction rate. On the other hand, the highly endothermic reaction for iron reduction requires an effective heat transfer from the process gas to the molten bath. In both cases, good agitation and mixing of the molten bath are important in achieving high productivity. This is ensured in my invention as both top and bottom injections are provided.

The molten iron produced in the smelting-reduction chamber enters the oxidation chamber by passing through submerged passages in a partition or barrier wall. The thickness of the wall and the size of the passages are designed to minimize back mixing. Industrial pure oxygen is injected from the top of the chamber to remove C, Si and P contained in the molten iron.

It is advantageous to perform the reduction and oxidation in a single process chamber for several reasons. First, the problems related to the transfer of the molten iron from a ironmaking furnace to a separate steelmaking furnace are eliminated. Second, the exhaust gas produced in the oxidation stage contains a high concentration of CO. That portion of the exhaust gas is integrated into the bulk exhaust gas and its thermal and chemical energies can, therefore, be utilized. For example, assuming molten iron is produced in the reduction stage containing 3% carbon and the carbon rate is 500 kg per mt of molten iron, I except a 6% saving in coal rate will be obtained if the energy in the exhaust gas produced in the oxidation stage is fully utilized.

The high temperature exhaust gases produced from prereduction, smelting/reduction and oxidation zones exit the process vessel through an exhaust stack. By passing through a waste heat boiler and a gas cleaning system (a cyclone and an electrostatic precipitator), the flue gas releases most of its heat which is then converted into steam and may be used to generate electricity. The fine particles contained in the flue gas are also eliminated from the exhaust by the gas cleaning system. The cool clean gas, which contains abundant CO, is preferably partially recycled to the prereduction shaft, after being heated to about 1200° C. in a hot stove, which preferably utilizes some of the surplus exhaust gas as fuel.

The use of a hot stove to heat a part of the clean flue gas which is recycled to the prereduction shaft makes full use of the energy contained in the flue gas (particularly when the surplus gas is used as fuel for the hot stove) and provides precise control of the reducing gas temperature before it is blown to the prereduction shaft.

My process is performed in a single, well sealed vessel which produces steel or semi-steel continuously from pulverized iron ore and coal. As shown in FIGS. 2-5 of the drawings, the vessel comprises a vertical prereduction shaft, generally designated A, a horizontal reduction-oxidation hearth, generally designated B, and a gas exhaust stack, generally designated C.

In comparison with the emerging coal-based iron or steelmaking processes, the present invention offers several advantages. Iron ore fines are used as a raw material. As a result, the need for pelletizing or sintering is eliminated. The use of screw conveyors for the transfer of the fine iron ore and flux particles allows precise measurement of the feed rate and permits a good seal of the prereduction shaft. The use of a gas distribution system ensures the dispersion of the fine particles within the shaft.

The elimination of the requirement for transferring of intermediate products from one apparatus to another considerably reduces the capital cost and environmental problems. It increases the thermal efficiency of the process, as well.

The provision of a quiescent zone for slag settling in the reduction portion of the vessel greatly minimizes iron content in slag. This increases iron recovery.

The high CO containing exhaust gas produced in the oxidation stage is integrated into the bulk process gas. Thus, the thermal and chemical energies of the exhaust gas are used to generate electricity and to prereduce the iron concentrate. This will considerably reduce fuel consumption.

The use of hot stoves as heat exchangers, unique in coal-based iron and steel making processes, provides a high and well controlled reducing gas temperature.

As shown in FIG. 4, the material feeding system is located over the top of the prereduction shaft A. The dry iron concentrate, contained in three normally sealed feed bins 10, 12 and 14, is first charged to a sealed hopper 16, which is located over prereduction shaft inlet 18, through a screw conveyor 20. A valve is provided at the bottom of each bin which closes when the bin is receiving feed from the feed storage. This prevents air infiltration into the prereduction shaft.

The fine flux particles contained in two bins 22, 24, are also fed into hopper 16 by another screw conveyor 26. The fine particles, blended in the hopper, descend to the prereduction shaft inlet 18 where the particles are distributed by a stream of cold reducing gas, which flows through an inner concentric tube 28, and discharges radially into the shaft. The slot 30 at the end of tube 28 is designed in such a way that the passing gas has sufficient kinetic energy to distribute the fine particle mixture evenly into prereduction shaft A. A water cooling block 25 is used to cool hopper 16.

Figure 2:
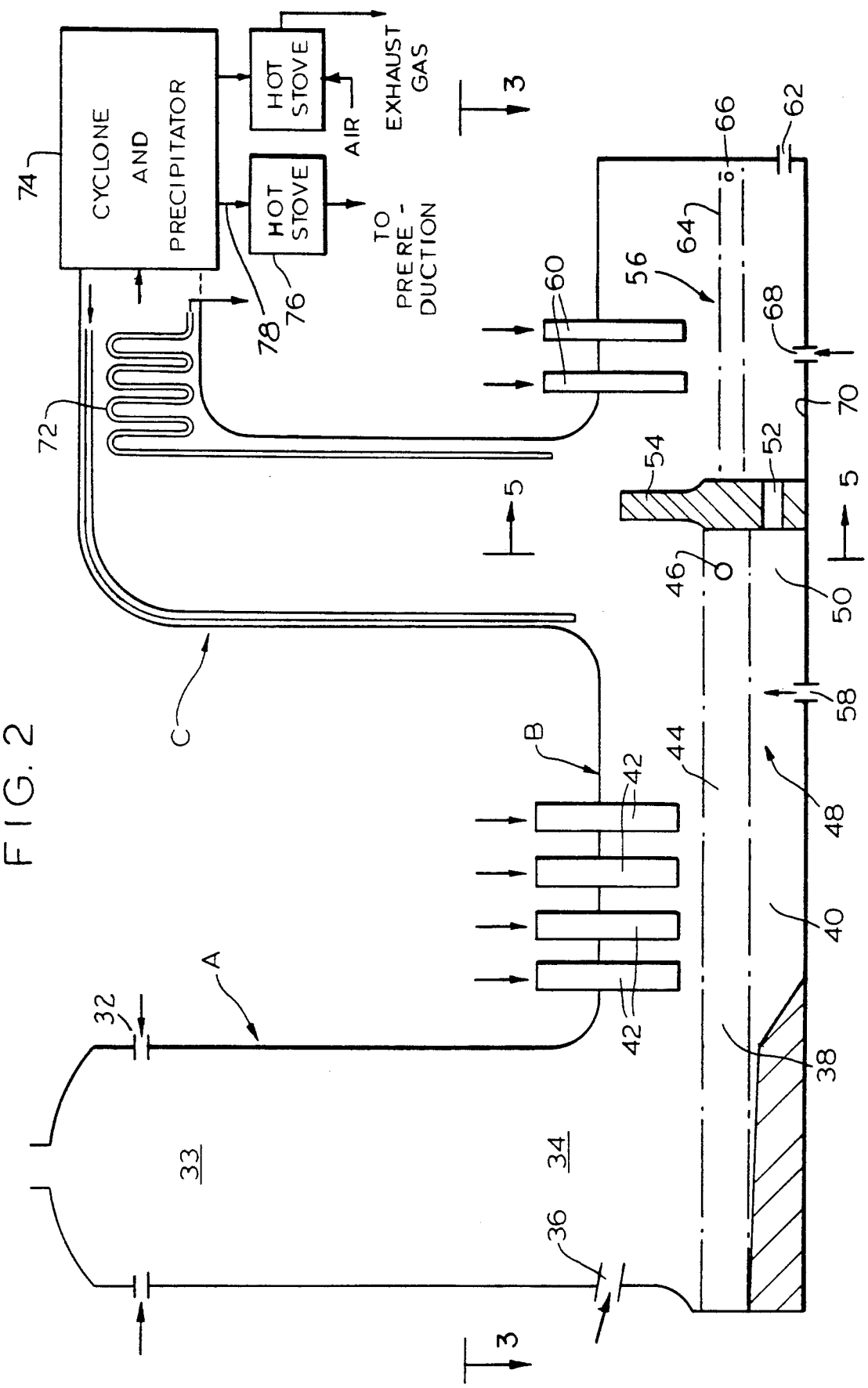
FIG. 2 is a cross-sectional side view of the vessel of the present invention.
Figure 3:
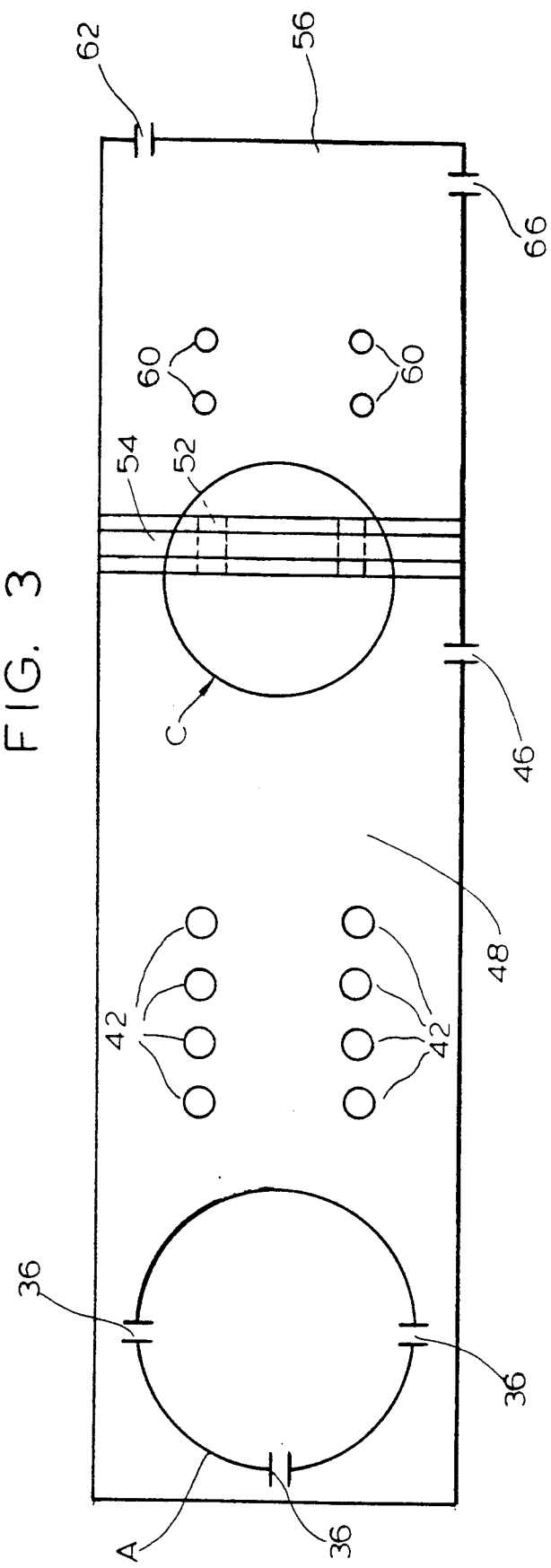
FIG. 3 is a top view of the vessel of FIG. 2, taken along line 3—3.
Figure 5:
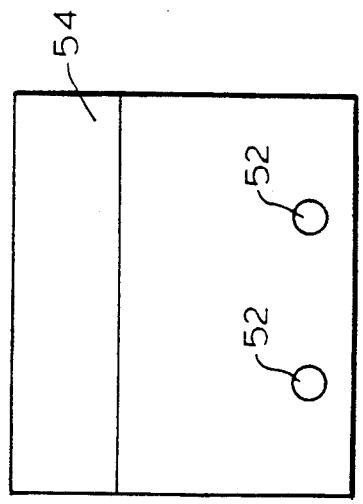
FIG. 5 is a front elevational view of the barrier of the vessel of the present invention showing the fluid passages.

As shown in FIG. 2, in the prereduction shaft A, the descending iron ore particles are heated and reduced to wustite by hot reducing gas which is blown in through tuyeres 32, located in the upper part 33 of shaft A. In the bottom part 34 of the shaft, the partially reduced iron ore is melted after passing through the high temperature zone 34, as a result of coal combustion in front of burners 36, to form a high FeO fluid slag 38. The fluid slag 38 will then enter the reduction hearth 40.

In the reduction hearth 40, pulverized coal is injected along with industrial pure oxygen or oxygen enriched air through the top lances 42. The high FeO slag 38 is reduced to iron by the dissolved carbon in the molten metal. The fluid slag 44 produced at this stage is tapped out through a tapping hole 46, after passing through the quiescent zone 48 to sediment the entrained iron droplets.

To increase the separation rate and efficiency of separation between the slag and molten iron in the quiescent zone 48, it may be desirable to include additional barriers between the reduction zone and the quiescent zone or alternatively to lengthen the quiescent zone to some extent.

The molten iron 50 now passes through passages 52 in a partition wall or barrier 54 and enters the oxidation zone 56. Desulfurization also takes place in oxidation zone 56. The capability of the lime slag to absorb sulfur is a function of slag basicity and FeO content. The violent stirring of the fluid in the reduction chamber 40 may result in the desulfurization process being retarded by the high FeO content of the slag, as a result of entrainment of iron droplets which are soon oxidized by the impinging air stream. A substantial portion of the sulfur in the iron may therefore be removed in the quiescent settling zone 48, where FeO in the slag is expected to be low. To enhance slag settling and desulfurization, an inert gas (e.g. nitrogen) is introduced through agitation tuyeres 58 located at the bottom of the reduction chamber 40.

In the oxidation chamber 56, industrial pure oxygen is injected through top lances 60, to oxidize carbon, silicon and phosphorus in the molten iron. The end product is tapped continuously or periodically from a tapping hole 62, into a ladle and is subject to further treatment, if needed. The slag 64 produced at this oxidation stage is disposed of after being tapped periodically from a tapping hole 66. Again, to enhance the oxidation reaction, bottom agitation by oxygen tuyeres 68 is employed.

To compensate for the pressure drop required for molten metal and slag flow and to enable tapping out most of slag and metal prior to furnace shut down for repair, the floor 70 of the horizontal chamber (including reduction and oxidation zones 40 and 56) is inclined slightly toward tapping hole 62. The inclination need only be a small amount, preferably about 3° from the horizontal.

The exhaust gases from the prereduction shaft A and the reduction and oxidation hearth B are integrated and removed through stack C. The exhaust gas passes through a waste heat boiler 72, to convert its latent heat to steam which is used to generate electricity, a cyclone and an electrostatic precipitator 74 to remove the fine dust particles. About half of the clean gas is recycled back to the prereduction shaft after being heated up to about 1200° C. in hot stoves 76, which preferably use another half of the clean gas as fuel in fuel port 78.

EXAMPLE OF THE INVENTION

In this example, the apparatus described above is used for producing 100 mt of steel per hour. Table 1 (a,b,c) below shows the chemical analysis of the iron concentrate, coal and lime flux. The industrial pure oxygen used in the prereduction, reduction and oxidation sections contains about 95% $O_2$ and 5% $N_2$.

The heat loss from each section of the process vessel is assumed to be 10% of the respective input energy. The heat transfer efficiency in the reduction chamber is assumed to be 80% and the ratio of $CO/CO+CO_2$ at the lower part of the prereduction shaft A is assumed to be 0.5.

TABLE 1 (a)

| Iron concentrate composition | | | | | |
|---|---|---|---|---|---|
| Fe | $SiO_2$ | CaO | $Al_2O_3$ | MgO | $P_2O_5$ |
| 65 | 5.9 | 0.5 | 0.3 | 0.3 | 0.1 |

TABLE 1 (b)

| Coal composition | | | | | | |
|---|---|---|---|---|---|---|
| C | H | N | O | S | Ash | $SiO_2$ in ash |
| 79.5 | 5.2 | 1.5 | 6.5 | 1.32 | 5.95 | 50 |

TABLE 1 (c)

| Flux composition | | |
|---|---|---|
| CaO | $SiO_2$ | $CO_2$ |
| 98 | 0.5 | 1.5 |

Table 2 shows the target metal and slag temperatures in each processing stage:

TABLE 2

| Assumed slag and metal temperatures in each processing stage | | |
|---|---|---|
| | slag | metal |
| prereduction | 1350 | — |
| reduction | 1500 | 1470 |
| oxidation | 1570 | 1550 |

On the basis of the above assumption, a heat and mass balance calculation yields the results set forth in Tables 3 and 4. Table 3 shows the weights of the required feed materials as well as slag and metal in each processing stage for producing 100 mt of steel per hour:

TABLE 3

| Weights of condensed materials (mt/hr) | | | | | |
|---|---|---|---|---|---|
| | Materials | | | | |
| Stages | Iron concentrate | Flux | Coal | Slag | Hot Metal |
| prereduction | 155.4 | 11.69 | 0.57 | 159.2 | — |
| reduction | — | — | 62.98 | 24.76 | 104.1 |
| oxidation | — | 3.49 | — | — | 100 |

Table 4 shows the weights and percentages of gas species in each processing stage:

TABLE 4

| | | Gas volumetric flow rates and compositions | | | | | |
|---|---|---|---|---|---|---|---|
| | | | Composition | | | | |
| Stage | | CO | $CO_2$ | $N_2$ | $H_2$ | $H_2O$ | TOTAL |
| prereduction in | $NM^3/hr$ | 48540 | 45630 | 2073 | 12230 | — | 108500 |
| | % | 44.75 | 42.06 | 1.91 | 11.28 | — | 100 |
| prereduction out | $NM^3/hr$ | 28030 | 66980 | 2132 | 3495 | 8730 | 109400 |
| | % | 25.62 | 61.24 | 1.95 | 3.20 | 7.99 | 100 |

TABLE 4-continued

| Stage | | Gas volumetric flow rates and compositions | | | | | |
|---|---|---|---|---|---|---|---|
| | | Composition | | | | | |
| | | CO | $CO_2$ | $N_2$ | $H_2$ | $H_2O$ | TOTAL |
| Reduction | NM/hr | 91300 | 91300 | 3989 | 24460 | 24460 | 235500 |
| | %3 | 38.77 | 38.77 | 1.10 | 10.38 | 10.38 | 100 |
| Exhaust | NM/hr | 97090 | 91300 | 4146 | 24460 | 24460 | 241500 |
| | % | 40.21 | 37.81 | 1.72 | 10.13 | 10.13 | 100 |

Table 5 shows the consumptions of industrial pure oxygen in the different processing stages.

TABLE 5

| Oxygen Consumption ($Nm^3$/hr) | | | |
|---|---|---|---|
| prereduction | reduction | oxidation | Total |
| 1042 | 37130 | 3158 | 41330 |

Table 6 shows the coal consumptions for the prereduction and reduction stages under the assumed conditions. The total coal consumption is 610 kg per mt (1000 kg) of hot iron produced. The flue gas has a temperature of above 1500° C. Assume that the exit gas temperature from the waste heat boiler is 300° C.; this gives a total heat of $1.32 \times 10$ cal/hr, as is released from the flue gas. Assuming 35% being the efficiency for thermal energy converted to electric yields $5.37 \times 10^7$ W for electricity production. By subtracting $1.65 \times 10^7$ W which will be used for oxygen production (assuming 0.4 kwh/$NM^3$ oxygen is required), a net electricity production of $3.72 \times 10^7$ W results which can be used for other purposes.

TABLE 6

| Coal Consumption (mt/hr) | | |
|---|---|---|
| prereduction | reduction | Total |
| 0.66 | 63.10 | 63.76 |

It will now be appreciated that the present invention relates to a method and apparatus for continuously converting iron ore and coal into steel or semi-steel in a single sealed vessel. The apparatus requires relatively small capital investment because of the elimination of coke oven and sinter plant. It is efficient to operate because material transfer is eliminated and the thermal and chemical energies from the exhaust gases are utilized. Moreover, the process is environmentally safer than conventional processes because the product is produced in a single vessel which comprises three interconnected, well sealed sections.

While only a single preferred embodiment of the present invention has been described for purposes of illustration, it is obvious that many variations and modifications could be made thereto. It is intended to cover all of these modifications and variations which are encompassed by the invention as defined by the following claims:

I claim:

1. A method for continuously producing steel or semi-steel product from iron ore concentrate and pulverized coal in a sealed unitary vessel having a vertically extending prereduction section with an upper portion and a lower portion, a horizontally extending section including a reduction portion and an oxidation portion, the reduction portion including a quiesent zone and a barrier separating the quiesent zone from the oxidation portion of the horizontally extending section, the method comprising the steps of:
(a) introducing a mixture of fine particles of iron ore concentrate including carbon and impurities and pulverized flux into the upper portion of the vertically extending prereduction section of the vessel;
(b) introducing heated gas into the upper portion of the vertically extending prereduction section to heat and partially reduce the iron concentrate particles to form FeO, the heated gas and particles moving co-currently into the lower portion of the prereduction section of the vessel;
(c) melting the FeO to form fluid slag with the flux in the lower portion of the prereduction section of the vessel;
(d) in the reduction portion, introducing pulverized coal and oxygen to the molten bath in which FeO is reduced to iron and exhaust gases are produced, agitating the molten bath, iron droplets being produced by such agitation;
(e) permitting the iron droplets to settle in the quiescent zone of the vessel as waste slag and molten iron are formed;
(f) removing waste slag from the quiescent zone;
(g) permitting the molten iron to flow through a passage in the lower portion of barrier into the oxidation portion of the vessel;
(h) introducing oxygen into the oxidation portion to remove impurities from the molten iron to form the product;
(i) removing the product from the oxidation portion; and
(j) removing exhaust gases from the vessel.

2. The method of claim 1 wherein the upper portion of the prereduction section has an inlet and wherein the step of introducing a mixture of fine particles comprises the step of charging a hopper with fine particles of dry iron ore concentrate and pulverized flux from feed bins by screw conveyors, the hopper having an outlet connected to the inlet in the upper portion of the prereduction section of the vessel.

3. The method of claim 2 further comprising the step of introducing a distribution gas into said outlet of the hopper portion.

4. The method of claim 2 further comprising the step of cooling the inlet of the upper portion.

5. The method of claim 2 further comprising the step of radially directing the particles as they enter the upper portion.

6. The method of claim 1 wherein the step of introducing pulverized coal and oxygen comprises the step of introducing industrial pure oxygen or oxygen enriched air.

7. The method of claim 1 wherein the molten bath in the reduction portion has a surface and wherein the step of introducing pulverized coal and oxygen comprises the step of introducing pulverized coal and oxygen at a level above the surface of the molten bath.

8. The method of claim 1 wherein the barrier passage is at a given level and the waste slag is removed from the quiescent zone at a level above the level of the barrier passage.

9. The method of claim 1 further comprising the step of introducing agitation gas into the quiescent zone.

10. The method of claim 1 wherein the molten iron has a surface and wherein the step of introducing oxygen comprises the step of introducing oxygen into the oxidation portion at a level above the surface of the molten iron.

11. The method of claim 1 further comprising the step of introducing agitation gas into the oxidation section.

12. The method of claim 1 wherein the vessel has a floor and further comprising the step of inclining the floor of the vessel.

13. The method of claim 1 wherein the exhaust gas contains heat and further comprising the step of recapturing the heat in the removed exhaust gas.

14. The method of claim 1 wherein the exhaust gas contains dust particles and further comprising the step of cleaning the removed exhaust gas to remove dust particles.

15. The method of claim 1 wherein the exhaust gas contains particles and further comprising the step of electrostatically precipitating particles out of the removed exhaust gas.

16. The method of claim 1 further comprising the steps of heating a portion of the exhaust gas and recycling the heated portion of the exhaust gas to the upper portion of the prereduction section.

17. The method of claim 16 wherein a portion of the exhaust gas is used as fuel for the exhaust gas heater.

18. The method of claim 1 further comprising the step of removing waste slag from the oxidation section.

19. The method of claim 18 wherein the product has a surface and wherein the step of removing the waste slag is preformed at a level above the surface of the product in the oxidation portion.

20. A method for continuously producing molten iron from fine iron ore concentrate and pulverized coal in a sealed vessel having substantially vertically and horizontally extending sections, said vertically extending section having an upper portion and a lower portion, the method comprising the steps of:
(a) introducing a mixture of fine particles of iron ore concentrate and pulverized flux into the upper portion of the vertically extending section of the vessel;
(b) introducing heated gas into the upper portion of the vertically extending section to heat and partially reduce the iron concentrate particles to form FeO, the gas and particles moving co-currently from the upper portion into the lower portion of the vertically extending section of the vessel;
(c) melting the FeO to form fluid slag with the flux in the lower portion of the vertically extending section of the vessel;
(d) introducing pulverized coal and oxygen in the horizontally extending section to the molten both in which wustite is reduced to iron and exhaust gases are produced, agitating the molten bath, iron droplets being formed by such agitation;
(e) permitting the iron droplets to settle as waste slag and molten iron ore formed;
(f) removing waste slag from the horizontally extending section; and
(g) removing molten iron from the horizontally extending section; and
(h) removing exhaust gases from the vessel.

21. The method of claim 20 wherein the vertically extending section includes an inlet and wherein the step of introducing a mixture of fine particles comprises the step of charging a hopper with fine particles of dry iron ore concentrate and pulverized flux from feed bins by screw conveyors, the hopper having an outlet connected to the inlet in the upper portion of the prereduction section of the vessel.

22. The method of claim 21 further comprising the step of introducing a distribution gas into said outlet of the hopper portion.

23. The method of claim 21 further comprising the step of cooling the inlet of the upper portion.

24. The method of claim 21 further comprising the step of radially directing the particles as they enter the upper portion of the vertically extending section.

25. The method of claim 20 wherein the step of introducing pulverized coal and oxygen comprises the step of introducing industrial pure oxygen or oxygen enriched air.

26. The method of claim 20 wherein the melt in the horizontally extending section has a surface and wherein the step of introducing pulverized coal and oxygen comprises the step of introducing pulverized coal and oxygen at a level above the surface of the melt.

27. The method of claim 20 wherein the waste slag is removed from a level above the level where the molten iron is removed.

28. The method of claim 20 further comprising the step of introducing agitation gas while the iron droplets are settling.

29. The method of claim 20 wherein the vessel has a floor and further comprising the step of inclining the floor of the vessel.

30. The method of claim 20 wherein the exhaust gas contains heat and further comprising the step of recycling the heat in the exhaust gas.

31. The method of claim 20 wherein the exhaust gas contains dust particles and further comprising the step of cleaning the exhaust gas to remove dust particles.

32. The method of claim 20 wherein in the exhaust gas contains particles and further comprising the step of electrostatically precipitating particles out of the exhaust gas.

33. The method of claim 20 further comprising the steps of heating a portion of the exhaust gas and recycling the heated portion of the exhaust gas to the upper portion of the prereduction section.

34. The method of claim 20 wherein the molten iron contains impurities and further comprising the step of removing impurities from the molten iron to form steel.

35. A method of reducing fine iron concentrate to molten iron in a sealed vessel including a vertically extending section having an upper portion and a lower portion and a horizontally extending section having a reduction portion and an oxidation portion, comprising the steps of: introducing fine particles of iron ore concentrate and pulverized flux into the upper portion of the vertically extending section, heating and reducing the iron concentrate with heated reducing gas to form FeO, the reducing gas and the particles moving co-currently from the upper portion to the lower portion of the vertically extending section, melting the FeO and flux in the lower portion of the vertically extending section to form fluid slag and pre-reduction process gases, the slag flowing from the lower portion of the vertically extending section into the reduction portion of the horizontally extending section, removing the pre-reduction process gas from the lower portion of the vertically extending section; reducing the iron contained in the slag as it flows through the horizontally extending section by introducing pulverized coal and oxygen so as to form a molten bath, separating the iron droplets from the slag by sedimentation so as to form molten iron and exhaust gas, removing waste slag and molten iron separately from the oxidation portion of the horizontally extending section, removing the exhaust gas from the horizontally extending section and recycling the removed pre-reduction process gas and exhaust gas to the upper portion of the vertically extending section.

36. The method of claim 35 wherein the removed gas is cooled during recycling.

37. The method of claim 35 wherein the removed gas is cleaned during recycling.

38. A method for continuously producing steel or semi-steel product from iron ore concentrate and pulverized coal in a sealed unitary vessel which consists of a vertically extending prereduction section and a horizontally extending section for final reduction and refining, the method comprising the steps of:
 (a) reducing the iron concentrate to FeO in the upper portion of the vertically extending prereduction section of the vessel by heated reducing gas which is introduced into the upper portion of the prereduction section and flows co-currently with the fine iron concentrate particles toward the lower portion of the prereduction section;
 (b) further reducing the FeO, which is melted in the lower portion of the prereduction section, to molten iron in the horizontally extending section of the vessel by injecting pulverized coal with oxygen the molten iron containing C. Si and P;
 (c) oxidizing C, Si and P contained in the molten iron which passes through a passage or passages in a barrier in the horizontally extending section of the vessel by injecting oxygen and removing exhaust gas containing heat from the horizontally extending section of the vessel;
 (d) recapturing the heat in the exhaust gas removed from the horizontally extending section and cleaning the exhaust gas to remove dust particles.

39. The method of claim 38 wherein the step of reducing fine iron concentrate to FeO comprises the steps of charging a mixture of fine particles of iron ore concentrate and pulverized flux into the upper portion of the vertically extending prereduction section of the vessel, introducing heated reducing gas, preferably at the temperature of 1100° to 1300° C., into the upper portion of the prereduction section to heat and partially reduce the iron concentrate particles to form FeO, and providing heat to melt the FeO which forms a fluid slag with the flux in the lower portion of the prereduction section of the vessel.

40. The method of claim 38 wherein the step of further reducing the FeO to molten iron comprises the steps of introducing pulverized coal and oxygen into the horizontally extending section of the vessel, permitting the entrained iron droplets to settle in the quiescent zone of the horizontally extending section, and providing agitation gas into the horizontally extending section proximate the bottom of the vessel.

41. The method of claim 38 wherein the step of oxidizing C, Si and P contained in the molten iron comprises the steps of permitting the molten iron to pass through a passage or passages in the lower portion of a barrier into the oxidation section of the horizontally extending section of the vessel, introducing oxygen into the oxidation section, and providing agitation gas into said oxidation section proximate the bottom of the vessel.

42. The method of claim 39 wherein the step of introducing a mixture of the particles comprises the step of charging a hopper with fine particles of dry iron ore concentrate and flux from feed bins by screw conveyors, the hopper having an outlet connected to the inlet of the upper portion of the prereduction section of the vessel.

43. The method of claim 42 further comprising the step of introducing a cold distribution gas, into the inlet of the upper portion of said prereduction section, said cold distribution gas having substantially the same composition as the hot reducing gas.

44. The method of claim 42 further comprising the step of cooling the outlet of the hopper.

45. The method of claim 42 further comprising the step of radially directing the particles of iron ore concentrate and flux as they enter the upper portion.

46. The method of claim 38 wherein the heat in the exhaust gas is recaptured by a waste heat boiler.

47. The method of claim 38 wherein the exhaust gas is cleaned by a cyclone and an electro-static precipitator.

48. The method of claim 38 further comprising the steps of heating a portion of the cleaned exhaust gas and recycling same to the upper portion of the prereduction section.

49. A method of continuously producing molten iron from iron ore concentrate and pulverized coal in a sealed unitary vessel which consists of vertically extending prereduction section and a horizontally extending final reduction section, the method comprising the steps of:
 (a) reducing fine iron concentrate to FeO in the upper portion of the vertically extending prereduction section of the vessel by heated reducing gas which is introduced into the upper portion of the prereduction section and flows co-currently with the fine iron concentrate particles;
 (b) further reducing the FeO, which is melted in the lower portion of the prereduction section, to molten iron in the final reduction section of the vessel by introducing pulverized coal which is injected with oxygen into the molten bath of the final reduction section so as to form exhaust gas containing heat; and
 (c) recapturing the heat in the exhaust gas and cleaning the exhaust gas to remove dust particles.

50. The method of claim 49 wherein the step of reducing fine iron concentrate to FeO comprises the steps of charging a mixture of fine particles of iron ore concentrate and pulverized flux into the upper portion of the vertically extending prereduction section of the vessel, introducing heated reducing gas, at the temperature in the range of between of 1100° to 1300° C., into the upper portion of the prereduction section to heat and partially reduce the iron concentrate particles to form FeO, and providing heat to melt the FeO which forms a fluid slag with the flux in the lower portion of the prereduction section of the vessel.

51. The method of claim 49 wherein the step of further reducing the FeO molten iron comprises the steps of introducing pulverized coal and oxygen into the final reduction section of the vessel, permitting the entrained droplets to settle in the quiescent zone of the final reduction section, and introducing agitation gas into the final reduction section.

52. The method of claim 50 wherein the step of introducing a mixture of fine particles comprises the step of charging a hopper with fine particles of dry iron ore concentrate and flux from feed bins by screw conveyors, the hopper having an outlet connected to the inlet of the upper portion of the prereduction section of the vessel.

53. The method of claim 52 further comprising the step of introducing a cold distribution gas into the inlet of the upper portion of the prereduction section, the cold distribution gas having substantially the same composition as the hot reducing gas.

54. The method of claim 53 further comprising the step of cooling the outlet of the hopper.

55. The method of claim 53 further comprising the step of radially directing the particles of iron ore concentrate and flux as they enter the upper portion.

56. The method of claim 49 wherein the heat in the exhaust gas is recaptured by a waste heat boiler.

57. The method of claim 49 wherein the exhaust gas is cleaned by a cyclone and an electro-static precipitator.

58. The method of claim 49 further comprising the steps of heating a portion of the cleaned exhaust gas and recycling same to the upper portion of the prereduction section.

59. A method of reducing fine iron concentrate to molten iron in a sealed vessel comprising a vertically extending section having an upper portion and a lower portion and a horizontally extending section comprising the steps of:
(a) introducing fine particles of iron ore concentrate and pulverized flux into the upper portion of the vertically extending section;
(b) heating and partially reducing the iron concentrate particles with recycled, heated reducing gas of about 1100° to 1300° C. to form FeO, the gas and particles moving co-currently from the upper portion to the lower portion of the vertically extending section;
(c) melting the FeO and flux in the lower portion of the vertically extending section to from fluid slag, the slag flowing from the lower portion of the vertically extending section into the horizontally extending section;
(d) removing the process gas produced during prereduction from the lower portion of the vertically extending section the removal process gas containing heat;
(e) reducing the FeO contained in the slag as it flows through the horizontally extending section by introducing pulverized coal and oxygen to form molten iron;
(f) separating entrained iron and exhaust gas droplets from the slag by sedimentation;
(g) removing waste slag and molten iron separately from the horizontally extending section;
(h) removing the exhaust gas produced during final reduction and recycling said exhaust gas directly to the upper portion of the vertically extending section; and
(i) recapturing the heat in the process gas produced during prereduction from the lower portion of the vertically extending section and cleaning said gas to remove dust particles.

60. A method of reducing iron concentrate to molten iron in a sealed vessel comprising a vertically extending section having an upper portion and a lower portion and a horizontally extending section comprising the steps of:
(a) introducing fine particles of iron ore concentrate and pulverized flux into the upper portion of the vertically extending section;
(b) heating and partially reducing the iron concentrate particles to form FeO with reducing gas produced by oxygen-coal burners, the gas and particles moving co-currently from the upper portion to the lower portion of the vertically extending section;
(c) melting the FeO and flux in the lower portion of the vertically extending section to from fluid slag, the slag flowing from the lower portion of the vertically extending section into the horizontally extending section;
(d) reducing the FeO contained in the slag as it flows through the horizontally extending section by introducing pulverized coal and oxygen to form molten iron;
(e) separating entrained iron droplets from the slag by sedimentation;
(f) removing waste slag and molten iron separately from the horizontally extending section; and
(g) recapturing the heat in the exhaust gas produced during prereduction and final reduction from the horizontally extending section and cleaning said gas to remove dust particles.

* * * * *